United States Patent
Boettner

(10) Patent No.: US 7,597,119 B2
(45) Date of Patent: *Oct. 6, 2009

(54) FLEXIBLE AND EXTENDABLE HOSE FOR HOLDING TANK DRAINAGE

(76) Inventor: E. Michael Boettner, 799 Industrial Dr. SW., Cleveland, TN (US) 37311-8263

(*) Notice: Subject to any disclaimer, the term of this patent is extended or adjusted under 35 U.S.C. 154(b) by 0 days.

This patent is subject to a terminal disclaimer.

(21) Appl. No.: 12/200,507

(22) Filed: Aug. 28, 2008

(65) Prior Publication Data

US 2009/0032131 A1    Feb. 5, 2009

Related U.S. Application Data

(63) Continuation-in-part of application No. 11/446,026, filed on Jun. 2, 2006, now abandoned.

(60) Provisional application No. 60/968,464, filed on Aug. 28, 2007, provisional application No. 60/714,772, filed on Sep. 8, 2005.

(51) Int. Cl.
*F16L 11/12* (2006.01)

(52) U.S. Cl. ............... 138/119; 138/118; 138/121; 138/122

(58) Field of Classification Search ............ 138/118, 138/119, 121, 122
See application file for complete search history.

(56) References Cited

U.S. PATENT DOCUMENTS

| | | | | |
|---|---|---|---|---|
| 4,006,599 A | * | 2/1977 | Hegler et al. | 405/49 |
| 4,082,327 A | * | 4/1978 | Sting et al. | 285/401 |
| 4,557,510 A | * | 12/1985 | Overmyer | 285/305 |
| 4,629,641 A | * | 12/1986 | Paullin | 428/36.9 |
| 4,969,670 A | * | 11/1990 | Bonnema et al. | 285/319 |
| 5,015,515 A | * | 5/1991 | Paulin | 428/36.8 |
| 5,071,173 A | * | 12/1991 | Hegler et al. | 285/399 |
| 5,311,753 A | * | 5/1994 | Kanao | 68/208 |
| 5,507,319 A | * | 4/1996 | Kanao | 138/110 |
| 5,707,066 A | * | 1/1998 | Sugiura et al. | 277/634 |
| 5,813,701 A | * | 9/1998 | Noble | 285/4 |
| 5,829,916 A | * | 11/1998 | Evans | 405/43 |
| 5,915,735 A | * | 6/1999 | Noble | 285/4 |
| 6,041,825 A | * | 3/2000 | Smith et al. | 138/109 |
| 6,223,777 B1 | * | 5/2001 | Smith et al. | 138/109 |
| 6,644,357 B2 | * | 11/2003 | Goddard | 138/121 |
| 6,840,285 B2 | * | 1/2005 | Toliver et al. | 138/121 |

* cited by examiner

Primary Examiner—Patrick F Brinson
(74) Attorney, Agent, or Firm—Miller & Martin PLLC

(57) ABSTRACT

A flexible collapsible corrugated sewer hose has a collapsible and expandable corrugated section providing durability, a tight bend radius and a relatively small collapse ratio. An expansion of the corrugations permits convenient manipulation and installation of the sewer hose having a self supporting structure and crush resistance without helical reinforcement.

20 Claims, 5 Drawing Sheets

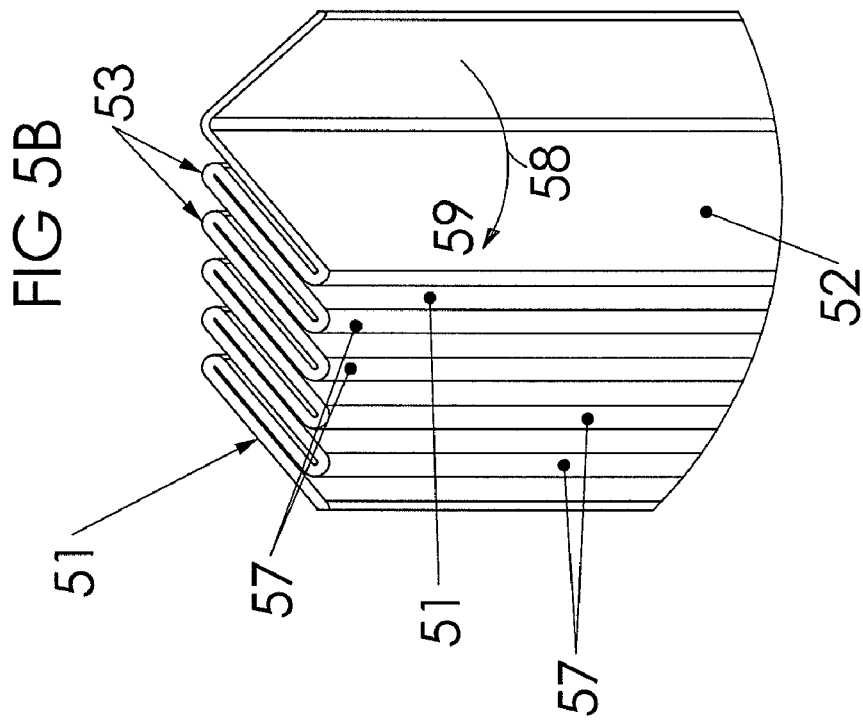
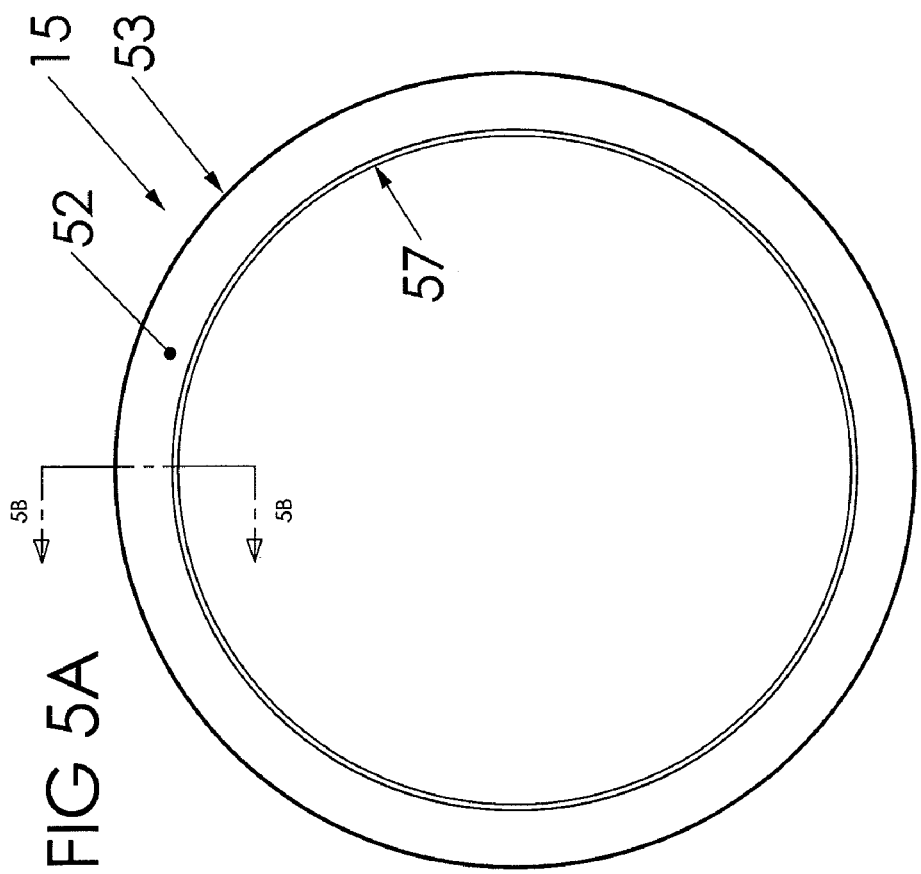

FLEXIBLE AND EXTENDABLE HOSE FOR HOLDING TANK DRAINAGE

The present application claims the benefit of the filing date U.S. Provisional Patent Application No. 60/968,464 filed Aug. 28, 2007 and is a continuation-in-part of U.S. patent application Ser. No. 11/446,026 filed Jun. 2, 2006 now abandoned which claims priority to U.S. Provisional Patent Application Ser. No. 60/714,772 filed Sep. 8, 2005, both applications being incorporated herein by reference.

FIELD OF THE INVENTION

This invention relates to a sewer hose, particularly adapted for use by removable affixation to a holding tank for drainage, as in connection with the holding tank of a recreational vehicle.

BACKGROUND OF THE INVENTION

Recreational vehicles, buses, boats and other vehicles with portable living accommodations are commonly equipped with holding tanks for both gray water and sewage. Periodically these tanks must be drained into a sanitary sewage system. The holding tanks are typically discharged into the sewer through a compressible or collapsible hose which can be expanded and fitted both to the holding tank outlet and to an inlet for the sewer. Gravity then induces flow between the holding tank and the sanitary sewage system. In addition to serving in this capacity when the holding tank is to be drained, there are some recreational vehicle facilities with sewer inlets at individual parking locations or campsites so that the sewer hose can connect the recreational vehicle to the sewer for an extended duration. In this arrangement, the waste matter need not be held in the sewage holding tank, but may pass directly to the hose and into the sewer system. The manual connection and disconnection of the sewer hose between vehicle holding tank and sewer inlet can be unsanitary and unpleasant, particularly when there are difficulties with adapters or fittings connecting the sewer hose to inlets and outlets or attendant to cleaning and storage of the sewer hose upon disconnection, as when leaving a campsite.

In order to serve its purpose, a sewer hose of this type should satisfy a number of criteria. These criteria include accommodating useful fittings at each end of the hose for fastening to the holding tank outlet, to the sewer inlet, or to another hose when it is necessary to join two sewer hoses for extended length. In addition, the sewer hose should be made of durable material that is chemically resistant so that it will not be damaged by exposure to sewage, and gray water, and sanitizing agents and should be easily cleaned. The sewer hose should also generally be expandable to a significant length when in use yet be collapsible for storage in a relatively compact form as most sewer hoses are stored in either an external cavity on the recreational vehicle or within a sealable plastic container. The sewer hose should be flexible enough to be easily positioned yet sufficiently rigid to maintain the consistent downward pitch from vehicle holding tank to sewer inlet needed for gravity flow. The sewer hose should be resistant to collapse and should resist abrasion and puncture and remain leak free through many cycles of use.

Hoses for this purpose have been in use for many years and have almost been uniformly made of strips of flexible vinyl film which are continuously extruded or wound in a helical pattern over a helical steel coil and glued or heat sealed to form a helically corrugated tube. A manufacturing process for hose tubing of this type is described in U.S. Pat. No. 6,024,134 to Akedo, et al. Higher quality sewer hose may utilize polyolefin or polypropylene film.

After manufacture of the hose, rigid couplings are threaded into the ends of the hose to facilitate connections to holding tanks and sewers. In some instances the couplings are permanently glued to the ends of the sewer hose, thereby necessitating disposal when the sewer hose is damaged or worn. Other couplings are removable. Since current sewer hoses have either left hand or right hand helixes, the removable couplings are made with corresponding left hand or right hand fittings and the two types are not entirely interchangeable. The structure of these hoses is similar to a plastic or vinyl covered light weight spring, such as the metal spring forming a traditional SLINKY spring toy. When left free, the hose tends to contract and the hose will not generally reach its nominal length unless under tension. The hoses are supple and do not support their own weight or hold a shape or position. Therefore, in order to maintain gravity flow, rigid supports may need to be placed under the hoses.

More recently, higher quality sewer hoses have been manufactured where the steel coils are coated with a first color of PVC prior to being wound with polyolefin or polypropylene tape of a second color. In this fashion, should the hose become abraded, as by dragging along the ground, damage penetrating the outer tape layer can be observed by contrast in color. In addition, the steel coil is not immediately exposed to moisture when the outer tape is abraded so that rust does not immediately ensue. This allows the sewer hose to be repaired or replaced in a timely fashion.

Furthermore, some of these polyolefin or polypropylene hoses have been made so that the helical corrugations can be expanded and remain open and provide the hose with sufficient rigidity not to require external support. However, these improved hoses are relatively expensive, typically costing between about 2-5 times the price of the ordinary vinyl tape hose. The tapes of all of these hoses are applied in several layers in order to achieve a total wall thickness of between about 15-25 mils. In some instances, the outer layer of tape has been formulated for UV resistance.

SUMMARY OF THE INVENTION

Therefore, various embodiments of the present invention provide one or more of the following advantages:

A sewer hose of the present invention may be open to its rated length and remain in the open state without applied tension, yet be collapsible to only about 20-25% of its rated length and will remain in a collapsed state without external constraints.

A sewer hose of the present invention may be formed into complex positions and will maintain these positions in many instances without the need for external supports. For instance, the hose may bridge irregularities in the ground without the need for secondary support.

A sewer hose of the present invention maybe formed from a seamless plastic tube so that it is not susceptible to seam related leakage.

A sewer hose of the invention may be fabricated without a wire or other hard support necessary to maintain shape and strength of the tubing.

A sewer hose of the invention may be manufactured in an extrusion type process and be made from materials from which are not easily adapted to helical seaming. Utilizing an extrusion process allows the co-extrusion in multiple layers of combinations of materials. Through the combination of multiple materials, properties may be selected for manufacture that are not available from a single material, such as chemical resistance and anti-microbial properties for an internal layer, UV resistance for an external layer, and flexibility.

By utilizing an inner layer of a first color and an external layer of a second contrasting color, if the crack or abrasion forms on the outer layer, the inner layer will show through indicating the potential failure.

A sewer hose of the invention may also be fabricated with ends to incorporate both right hand and left hand helix end sections. For instance, the hose may be made with right hand helix end cuffs immediately external of left hand helix cuff sections. Should it be desired to utilize the hose with right hand helix fittings, it can be used as manufactured. If it is desired to be used with left hand helix fittings, the right hand helix end cuffs are simply cut from the ends thereby exposing the left hand helix cuffs.

These and other objections of the invention will become apparent in connection with the following detailed explanation.

BRIEF DESCRIPTION OF THE DRAWINGS

The invention may be better understood from the reading of the detailed description in conjunction with a review of the drawings in which:

FIG. 5A is a sectional end view of sewer hose of FIG. 2 in a collapsed state.

FIG. 5B is a sectional view of the illustration of FIG. 5A taken along line 5B-5B.

DETAILED DESCRIPTION OF THE INVENTION

Figure 1:
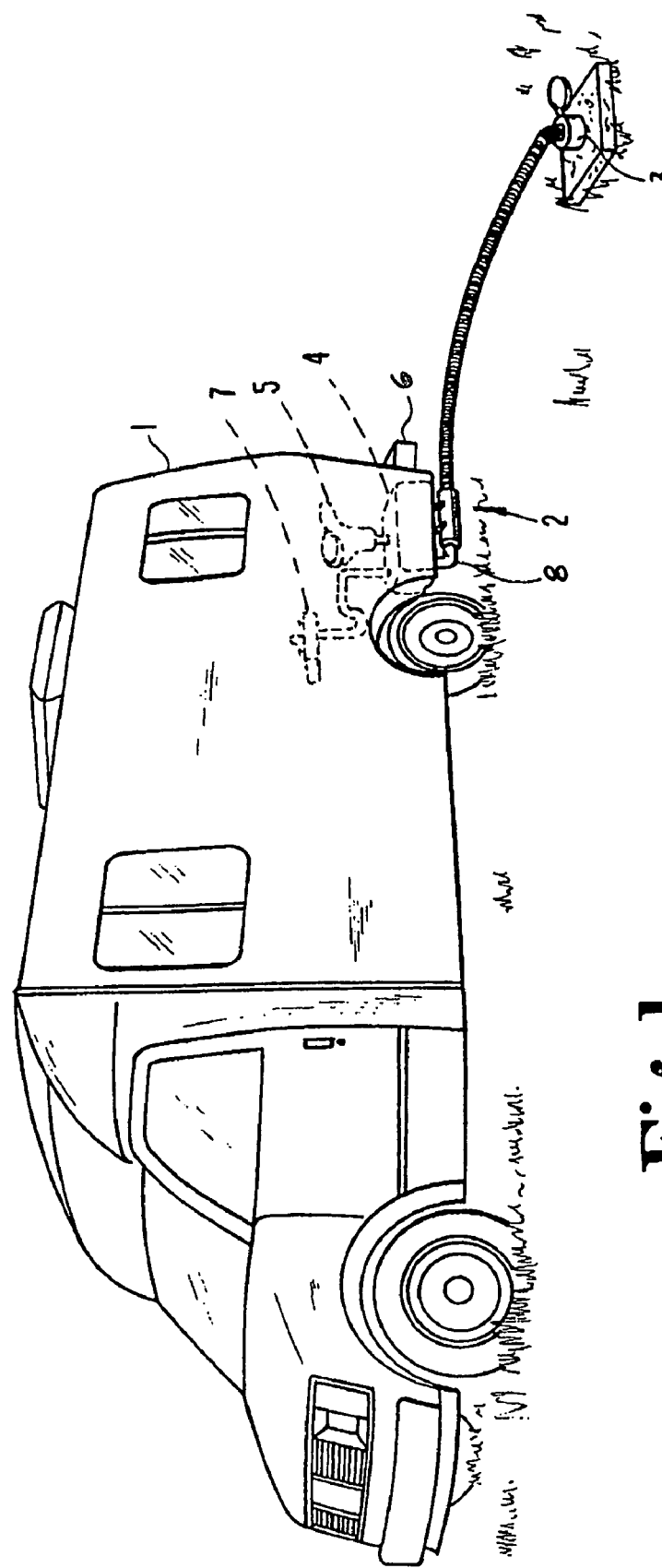
FIG. 1 is a perspective view of a recreational vehicle with a prior art hose connecting the vehicle holding tank to an in-ground sewer inlet.

Referring now to FIG. 1, there is shown a sewage draining device 2 adapted for use with a recreational vehicle 1 in accordance with one embodiment of the prior art. In conventional systems, a ten or twenty foot length (extended) of flexible drainage hose would often be stored in a special hollow bumper 6 proximal to the holding tank outlet coupling 8. The entire hose would be removed from bumper 6, connected at one end to outlet coupling 8 and the opposite end would be inserted into the sewage receptacle 3. Gray water from sink 7, or a shower, as well as sewage from toilet 5 is sent to holding tank 4. When the holding tank valve at the holding tank outlet coupling 8 is opened, gray water and/or sewage flows through the outlet coupling 8 and hose 2 into the sewage receptacle 3. The prior art hose 2 would also typically be advantageously fitted with a support structure such as disclosed in U.S. Pat. No. 4,228,978; 4,169,571; or 6,619,596 to maintain a consistent downward slope from outlet coupling 8 to sewage receptacle 3.

Figure 2:
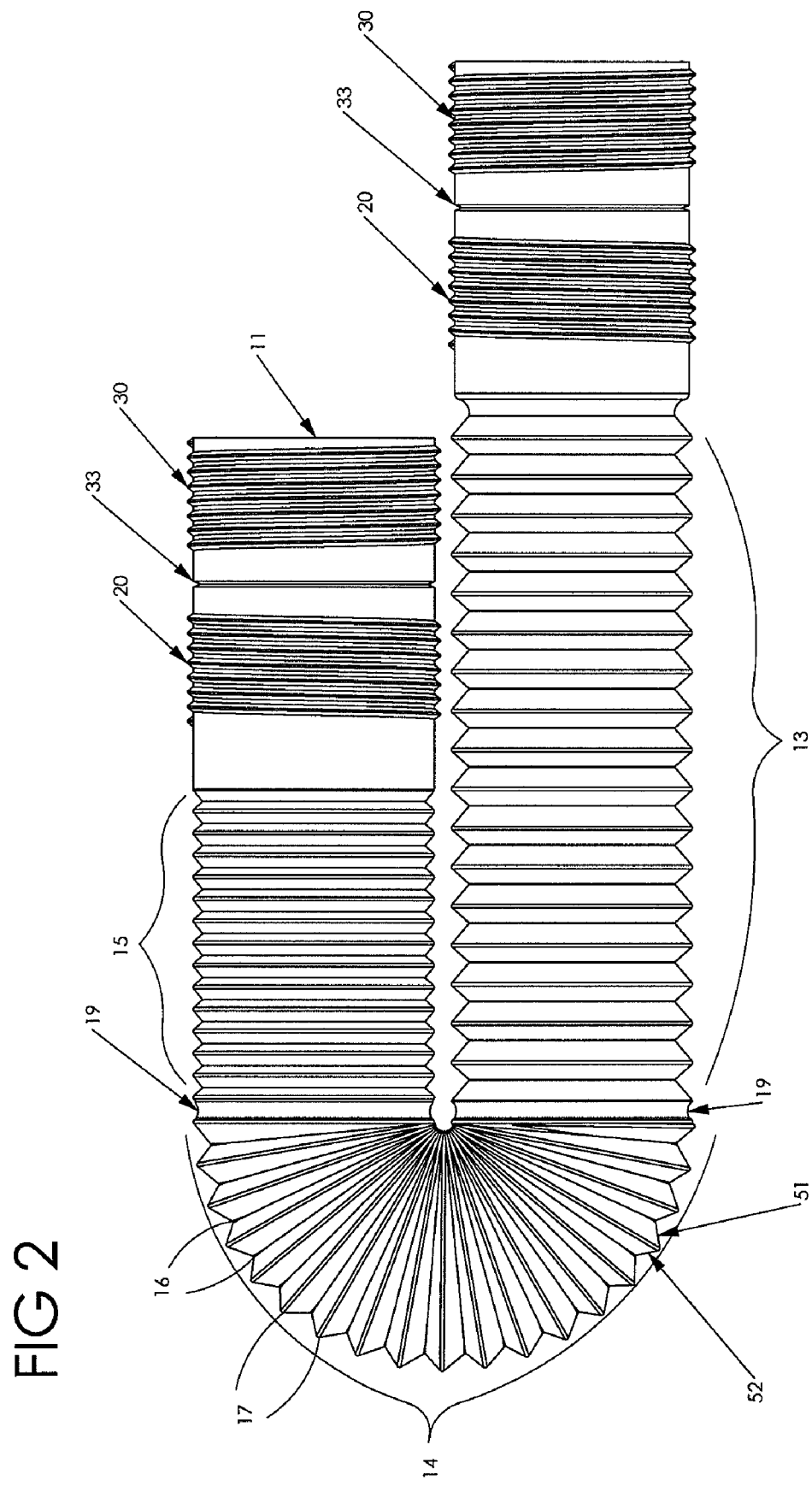
FIG. 2 is a side plan view of an embodiment of a sewer hose having both right hand and left hand helix cuff sections at each end.

FIG. 2 depicts an exemplary sewer hose 10 according to the present invention with left hand helix cuffs 20 and right hand helix cuffs 30 integrated into the end sections of the hose and positioned about an intermediate collapsible portion comprised of a plurality of annular corrugations of alternating smaller, minimum or minor diameter rings 16 separated by larger, maximum or major diameter rings 17 being respectively connected by alternating static walls 51 and tuck walls 52 to permit a section of the pipe to be fixed in an extended state 13; in a collapsed state 15 or in a curved or directed state 14.

Figure 4:
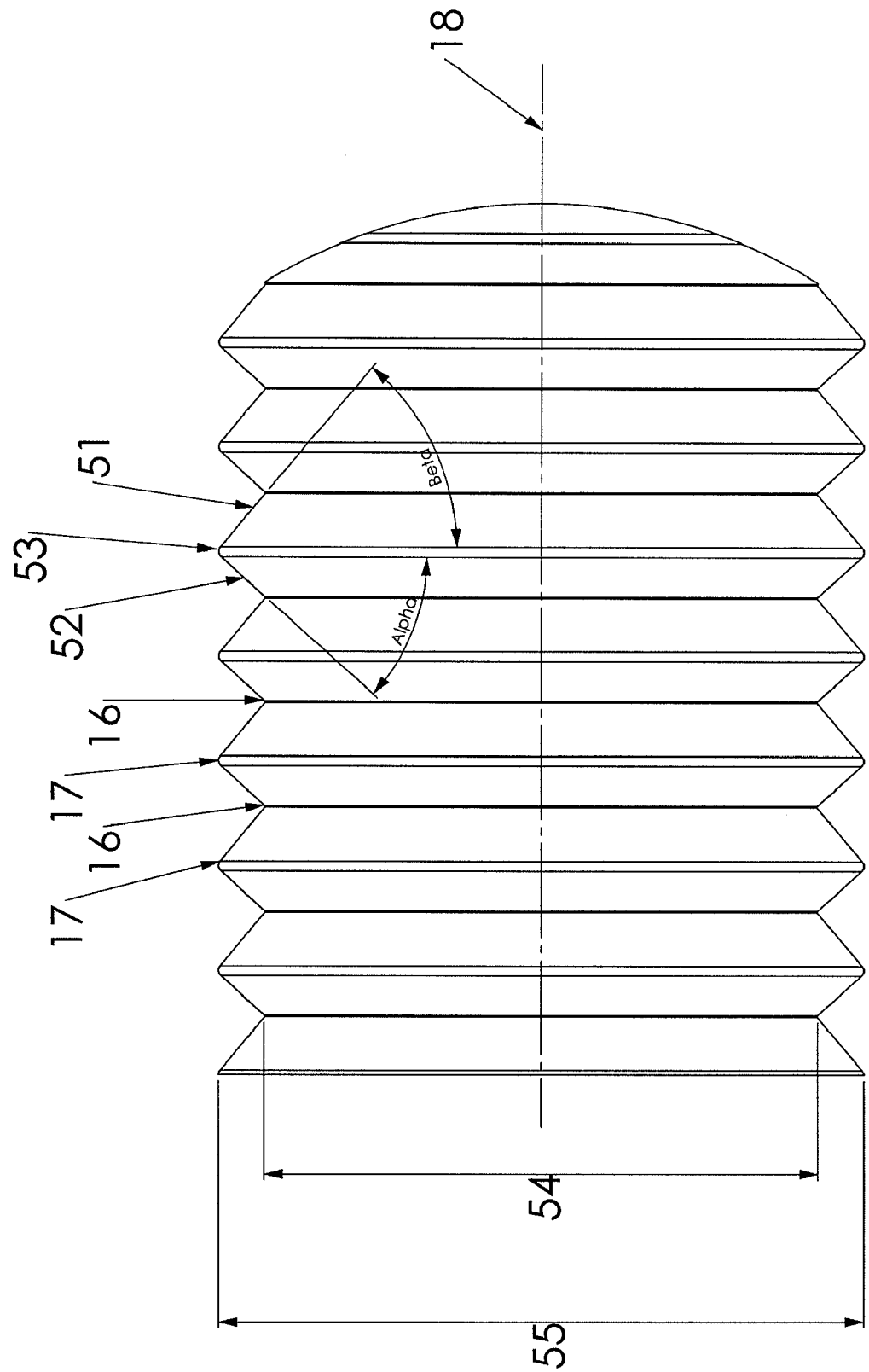
FIG. 4 is an enlarged view of expanded corrugations of the sewer hose of FIG. 2 in isolation.

An enlarged view of expanded corrugations is shown in FIG. 4 and an enlarged view of collapsed corrugations is shown in FIGS. 5A and 5B. Generally, the sewer hose is in a compressed state when the corrugations are collapsed so that tuck sides 52 are folded inward against static sides 51 as shown in FIG. 5B. The sewer hose is in an expanded state when tuck sides 52 are folded outward apart from static sides 51 to the extent possible, generally achieving angular orientation between the tuck and static sides of about 90 degrees and possibly even a slightly greater angular orientation. Of particular note in FIG. 2, are tooling points, shown as uncollapsable rings 19 with reverse arch shapes. These are desirable for use in manipulating the tubing for packaging.

Figure 3:
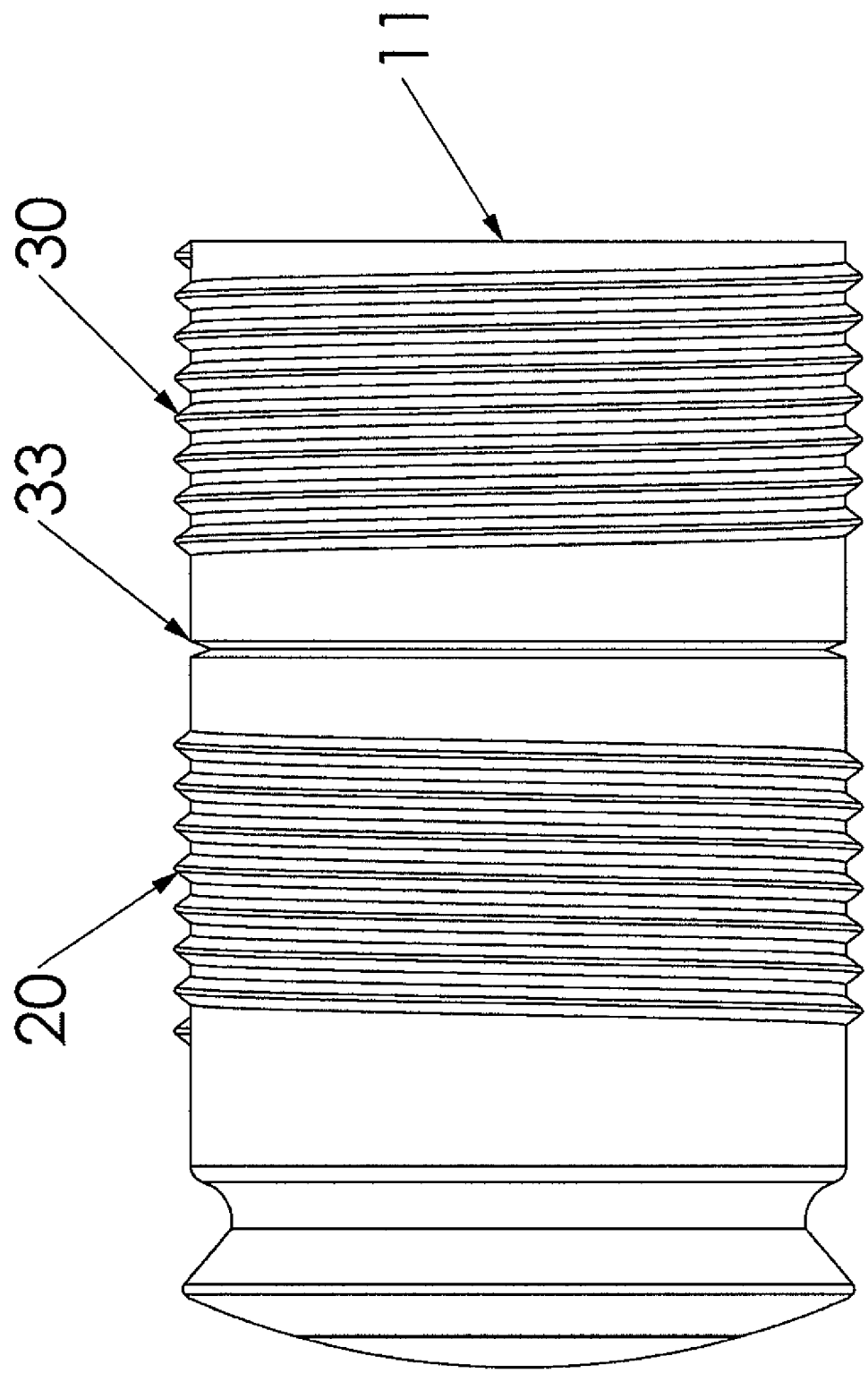
FIG. 3 is an enlarged side elevation view of the right hand and left hand helix cuff section on one end of the hose.

Turning then to FIG. 3, an end cuff 11 is shown in isolation with a distal right hand helix cuff 30 separated by trim guide 33 from a proximal helix cuff 20. If it is desired to utilize a sewer hose 10 with right hand helix fittings, the hose is used in its original configuration. On the other hand, if it is desired to utilize the hose with left hand helix fittings, then the hose is cut along trim line 33 to remove the right hand helix end cuff 30 and the left hand helix end cuff 20 then becomes the distal end of the sewer hose 10.

Some background concerning the measurements applied to corrugated tubing is helpful to their understanding. Corrugated tubing is manufactured in expanded state, typically on a machine called a corrugator. Most corrugated tubing manufactured today is not collapsible. However, when collapsible tubing is manufactured in expanded state, the expanded tubing is collapsed after manufacture, and some permanent deformation occurs. If the collapsed tubing is again expanded, it will not reach its original manufactured length but will typically be about 5%-15% shorter. Subsequent collapsing and expansion does not significantly alter the tubing's length. Accordingly, all measurements are taken after the tubing has been collapsed and then re-expanded after manufacture.

FIG. 4 shows expanded corrugations with tuck wall 52 having a length of 0.278 inches and connected at hinge 53 to static wall 51 having a length of 0.296 inches. Tuck wall 52 is at an angle of 48° with longitudal axis 18 of sewer hose 10 so that tuck angle $\alpha$ (alpha) equals 42° and static wall 51 is at an angle of 45° with longitudal axis 18 so that static angle $\beta$ (beta) equals 45° thereby resulting in a combined angle of 87° being formed between the tuck wall 52 and static wall 51. The minor rings 16 have an inner diameter of 2.739 inches 54 and the major rings 17 have an inner diameter of 3.20 inches 55. The shorter wall lengths and lesser difference between diameters 54, 55 of minor rings 16 and major rings 17 facilitate the collapsing of the corrugation, as does the preferred wall thickness of only about 0.028 to 0.040 inches that is required due to the simple hinge 53 and shorter distance between smaller and larger rings 16, 17.

A relatively uniform wall thickness can be produced on a corrugators. Each corrugation has a width of about 0.50 inches in expanded form. The corrugations of FIG. 4 are shown in collapsed form in FIGS. 5A and 5B. FIG. 5B is an enlarged view of one end of the section of FIG. 5A taken along the line 5B-5B. FIG. 5B shows how the tuck wall 52 moves from its original position through the arc 58 by flexing the hinge at 53 so that tuck wall 52 folds against static wall 51. Thus, the tuck wall 52 proceeds along arc 58 to the position 59, at which time tuck wall 52 is substantially aligned with the lateral axis or diameter of the major ring 17, the greatest pressure is exerted to bend tuck wall 52 and compress minor ring 16 so that the tuck wall 52 and smaller ring 16 defined by interior hinge 57 can pass through and be collapsed. In the corrugation design described in FIGS. 4 and 5, expansion of corrugations manually can be reasonably achieved as a force of only about 2.5 to 8 pounds is required depending upon the wall thickness and materials. In addition, a bend radius of only about 3.2 inches is achieved.

Thus, for this example of sewer hose, the following measures are applicable:

Wall thickness=0.35 inches
Ratio of static angle β to tuck angle α=1.07:1
Sum of α and β=87°
Collapse ratio=less than 1:4
Bend radius=3.2 inches
Ratio of bend radius to maximum diameter=1:1
Maximum diameter=3.20 inches
Minimum diameter=2.739 inches
Ratio of maximum diameter to minimum diameter=1.13:1
Length of static wall=0.296 inches
Length of tuck wall=0.278 inches
Ratio of static wall to tuck wall=1.06:1

In particular, a number of desirable characteristics are demonstrated to provide advantages individually and in combination. For a collapsible sewer hose, it is desirable that the wall thickness be between about 0.028 and 0.050 inches, and preferably between 0.030 and 0.040 inches. It is also desirable that the collapse ratio of the corrugated sections be less than about 1:4 and preferably close to about 1:5. Of particular significance for storage in a folded state, it is desirable to achieve a ratio of bend radius to maximum diameter of less than 1.5, and preferably less than 1.4 or 1.35, or even less than 1.1. The illustrated embodiment achieves a ratio of static wall to tuck wall length of less than 1.065 to 1. The ratio of the length of the static wall to the tuck wall is preferably less than 1.35, 1.30, 1.25, or 1.20. The sum of the angles α and β should be more than 80 degrees and less than 110 degrees and preferably less than 100 degrees. The tuck angle α should be at least 2 degrees less than static angle β and the ratio of β to α should be less than 1.25 and preferably less than 1.20, or 1.10. The force required to expand a corrugation should be no more than about eight pounds of force. The ratio to maximum diameter to minimum diameter should be less than 1.15 and the ratio of static wall to tuck wall length can be optimized to be proportionally similar, within about 10% of one another.

It will be seen that the corrugated sewer hose of the present invention includes no steel coils or indeed any helical coils of any hard or reinforcing material. In prior art, sewer hoses, it has been deemed necessary to include high tensile spring steel coils to protect the PVC tape hoses from collapsing. However, by extruding a corrugated sewer hose with greater wall thickness, the corrugations are able to withstand abuse and protect against accidental crushing. The variety of materials available for extrusion is broad and may include, for instance, polyurethanes, polyethylene, rubber, nylon, and many plastics.

The prior art sewer hoses that maintained their position had wall thicknesses of only about 0.020 inches and when those hoses are extended the tuck and static angles are each greater than 60° for a composite angle of over 130°. The prior static sewer hoses' tuck and static walls were of about equal length.

All publications, patents, and patent documents are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

We claim:

1. A flexible collapsible corrugated sewer hose comprising a first end section, an intermediate section having a wall formed of annular corrugations, and a second end section, in which the corrugations comprise smaller rings having tuck walls connected at tuck angles extending to larger rings so that tuck walls are hingedly connected at larger rings to static walls extending at static angles and the static walls connect larger rings to adjacent smaller rings, where the ratio of static angles to the tuck angles is less than 1.15 to 1.0 wherein an interior of the hose is extruded of a first material and an exterior of the hose is extruded of a second material.

2. The flexible collapsible sewer hose in claim 1 wherein the ratio of static wall angle to the tuck wall angles of the corrugations is less than 1.1 to 1.0.

3. The flexible collapsible sewer hose of claim 1 wherein the wall thickness is between about 0.028 and 0.040 inches.

4. The flexible collapsible sewer hose of claim 1 having an expanded length of at least 10 feet.

5. The flexible collapsible sewer hose of claim 1 wherein the ratio of the diameter of the larger rings to the diameter of the smaller rings is between 1.05 and 1.15.

6. The flexible collapsible sewer hose of claim 1 in which the larger rings have a major diameter and wherein the ratio of the bend radius of the hose to the major diameter is less than 1.35.

7. The flexible collapsible sewer hose of claim 1 having a collapse ratio less than 1 to 4.

8. The flexible collapsible sewer hose of claim 1 wherein tooling points are provided along the hose.

9. The flexible collapsible corrugated sewer hose of claim 1 wherein the hose is collapsed by bringing the static walls next to the tuck walls and the hose remains in collapsed position without external restraint.

10. The flexible collapsible corrugated sewer hose of claim 1 wherein the hose is expanded by separating the static walls from the tuck walls such that the angular orientation between the tuck wall and the static wall of a larger ring is between 80° and 110° and the hose remains expanded to its nominal length without the application of tension.

11. The flexible collapsible corrugated sewer hose of claim 1 wherein the intermediate section has sufficient rigidity to support its length at a constant pitch between two points to bridge irregularities in the ground without additional support structure.

12. The flexible collapsible corrugated sewer hose of claim 11 wherein when expanded, the hose walls connecting smaller rings to larger rings are tuck walls extending from the larger rings at tuck angles and the hose walls connecting larger rings to smaller rings are static walls extending from the larger rings at static angles, and the ratio of static angles to tuck angles is less than 1.15 to 1.0.

13. The flexible collapsible corrugated sewer hose of claim 12 wherein the sum of the tuck angle and the static angle defines the angular orientation between the tuck wall and the static wall and said angular orientation is in the range between 80° and 100°.

14. A flexible collapsible corrugated sewer hose comprising a front end section, an intermediate section of annular corrugations and a second end section wherein the annular corrugations comprise smaller rings and larger rings connected by hose walls and where each end section has a segment of right hand helix threads and a segment of left hand helix threads.

15. The flexible collapsible corrugated sewer hose of claim 14 wherein when expanded, the hose walls connecting smaller rings to larger rings are tuck walls extending from the larger rings at tuck angles and the hose walls connecting larger rings to smaller rings are static walls extending from the larger rings at static angles, and the ratio of static angles to tuck angles is less than 1.15 to 1.0.

16. The flexible collapsible corrugated sewer hose of claim 14 wherein the rings are not helical and do not include a reinforcing material.

17. A flexible collapsible corrugated sewer hose comprising a first end section, an intermediate section having a wall formed of annular corrugations, and a second end section, in which the corrugations comprise smaller rings having tuck walls connected at tuck angles extending to larger rings so that tuck walls are hingedly connected at larger rings to static walls extending at static angles and the static walls connect larger rings to adjacent smaller rings wherein the sum of the tuck angle and the static angle defines the angular orientation between the tuck wall and the static wall and said angular orientation is in the range between 80° and 110°.

18. The flexible collapsible corrugated sewer hose of claim 17 wherein the wall thickness is between about 0.028 and 0.040 inches.

19. The flexible collapsible corrugated sewer hose of claim 17 in which the larger rings have a major diameter and wherein the ratio of the bend radius of the hose to the major diameter is less than 1.35.

20. The flexible collapsible corrugated sewer hose of claim 17 having a collapse ratio less than 1 to 4.

* * * * *